(12) United States Patent
Kanayama (10) Patent No.: US 9,106,832 B2
(45) Date of Patent: Aug. 11, 2015

(54) STEREOSCOPIC IMAGE CAPTURING SYSTEM AND LENS DEVICE

(75) Inventor: Masaomi Kanayama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 13/603,105

(22) Filed: Sep. 4, 2012

(65) Prior Publication Data

US 2013/0057657 A1 Mar. 7, 2013

(30) Foreign Application Priority Data

Sep. 7, 2011 (JP) .................................. 2011-195059

(51) Int. Cl.
*H04N 13/02* (2006.01)
*H04N 5/232* (2006.01)

(52) U.S. Cl.
CPC ......... *H04N 5/2328* (2013.01); *H04N 5/23258* (2013.01); *H04N 13/0239* (2013.01); *H04N 13/0296* (2013.01)

(58) Field of Classification Search
CPC ... H04N 13/02; H04N 5/228; H04N 5/23296; H04N 5/2254; H04N 5/357; H04N 5/2253; H04N 5/23264; H04N 5/23287; H04N 2013/0081; H04N 21/44218; H04N 7/183; H04N 9/3135

USPC ............. 348/47, 48, 51, 208.2, 208.4, 208.7, 348/208.99
See application file for complete search history.

(56) References Cited

U.S. PATENT DOCUMENTS

| | | | | |
|---|---|---|---|---|
| 6,628,457 | B2 * | 9/2003 | Ito .................................. | 359/368 |
| 8,558,902 | B2 * | 10/2013 | Awazu et al. .............. | 348/208.4 |
| 2008/0055420 | A1 * | 3/2008 | Orihashi et al. ........... | 348/208.4 |

FOREIGN PATENT DOCUMENTS

| | | |
|---|---|---|
| JP | 2008-028900 A | 2/2008 |
| JP | 2008-203312 A | 9/2008 |
| JP | 2008-203317 A | 9/2008 |
| JP | 2009-03348 A | 3/2009 |
| JP | 2010-103895 A | 5/2010 |
| JP | 2011-139169 A | 7/2011 |
| WO | 2013/027343 A1 | 2/2013 |

* cited by examiner

*Primary Examiner* — Trang U Tran
(74) *Attorney, Agent, or Firm* — Canon U.S.A., Inc., IP Division (57) ABSTRACT

A stereoscopic image capturing system includes a plurality of lens devices with optical elements, a vibration detection unit, a control unit that calculates a drive signal to drive the optical element(s) for correcting image blurring based on an output from the vibration detection unit, and a driving unit that drives the optical element(s) based on the drive signal.

14 Claims, 7 Drawing Sheets

STEREOSCOPIC IMAGE CAPTURING SYSTEM AND LENS DEVICE

BACKGROUND OF THE INVENTION

1. Field of the Invention

Aspects of the present invention generally relate to a stereoscopic image capturing system and a lens device.

2. Description of the Related Art

Conventionally, in the film production industry, more realistic images have been demanded. Especially, in recent years, demands for stereoscopic images capable of expressing an image having a sense of depth have been greatly increasing. In the stereoscopic image capturing operation, in addition to the control of angles of view and in-focus positions which can be controlled in conventional image capturing, the control of a sense of depth of images is required.

The methods of controlling the sense of depth include a method of controlling the base-line length (the distance between the optical axes of two image capturing apparatuses) and the convergence angle (the angle between the optical axes of the two image capturing apparatuses) of the two image capturing apparatuses. More natural stereoscopic images can be captured by operating the apparatuses similarly to the movements of human eyes. Consequently, in general, the base-line length of the two image capturing apparatuses is fixed, and the convergence angle is controlled.

To control the convergence angle, a method of rotating the entire of the image capturing apparatus around an axis in the direction perpendicular to the optical axis, and a method of shifting an optical element such as a mirror and a prism to bend the light beam are proposed. Unfortunately, the above-described methods cause increase in the sizes of the structures of the image capturing apparatuses. In addition, the imaging capturing apparatuses are exclusively used for stereoscopic image capturing, and lack general versatility and usability.

To solve the problems, for example, Japanese Patent Application Laid-Open No. 2008-028900 discusses a method of controlling a convergence angle using an optical element (hereinafter, also referred to as "shift lens") provided for image blurring correction, the optical element moves within a plane perpendicular to the optical axis.

Japanese Patent Application Laid-Open No. 2010-103895 discusses a method of correcting image blurring while adjusting a convergence angle by driving shift lenses based on a value acquired by adding an amount of movement of the shift lens for adjusting the convergence angle and an amount of movement of the shift lens for correcting image blurring.

Although the shift lens is used for the convergence angle control (control in the optical axis direction), it is useful to use the shift lens for image blurring correction that is an original function of the shift lens.

However, in the known image capturing apparatuses discussed in Japanese Patent Application Laid-Open No. 2008-028900 and Japanese Patent Application Laid-Open No. 2010-103895, the driving units for correcting image blurring are also used as the driving units for controlling the convergence angles. Consequently, the mechanism is not expected for the use of adding an amount of drive for the convergence angle control to an amount of drive for the image blurring correction. As a result, when the amount of drive for the convergence angle control is added to the amount of drive for the image blurring correction, at the side the amount of drive for the convergence angle correction is added, a movable area wide enough to drive the optical element (shift lens) is not secured.

In such a state, if the value acquired by adding the amount of drive for the convergence angle control to the amount of drive for the image blurring correction is directly used to drive the optical element, due to mechanistic limitations in the movable region, only at the side the amount of drive for the convergence angle control, the optical element may not be fully driven. As a result, images that are not completely stabilized only in a particular direction and giving very uncomfortable feeling are acquired.

To solve the problem, even if the movable region of the optical element is simply widened to enable the driving unit to be driven without limiting the amounts of drive for the image blurring correction and the convergence angle control, the problem is not solved. This is because as the optical element shifts more, the decentration aberration increases further, and as a result, it is difficult to maintain the optical performance.

SUMMARY OF THE INVENTION

Aspects of the present invention include a stereoscopic image capturing system and lens device simultaneously performing convergence angle control (control in the optical axis direction) and image blurring correction. The stereoscopic image capturing system and lens device enable image capturing of stereoscopic images suitable for image capturing situations and objects.

According to an aspect of the present invention, a stereoscopic image capturing system includes a plurality of lens devices, where each lens device includes an optical element, a vibration detection unit that detects a vibration, a control unit that calculates a drive signal to drive the optical element for correcting image blurring based on an output from the vibration detection unit, and a driving unit that drives the optical element in a direction orthogonal to the optical axis based on the drive signal. The driving unit changes a drive center position, which is a position of the optical element when the vibration is not detected by the vibration detection unit, in a direction orthogonal to the optical axis. The control unit controls, if an amplitude of the optical element driven by the drive signal is one of a plurality of drive limit positions that is a limit position the optical element can be driven to and is larger than the distance between the nearest drive limit position that is the nearest to the drive center position and the drive center position, the driving unit to limit the amplitude or a range in which the drive center position is changeable.

According to another aspect of the present invention, a lens device includes an optical element, a vibration detection unit that detects a vibration, a control unit that calculates a drive signal to drive the optical element for correcting image blurring based on an output from the vibration detection unit, and a driving unit that drives the optical element in a direction orthogonal to the optical axis based on the drive signal. The driving unit changes the drive center position, which is a position of the optical element when the vibration is not detected by the vibration detection unit, in a direction orthogonal to the optical axis. The control unit controls, if an amplitude of drive of the optical element driven by the drive signal is one of a plurality of drive limit positions that is a limit position the optical element can be driven to, and is larger than the distance between the nearest drive limit position that is the nearest to the drive center position and the drive center position, the driving unit to limit the amplitude or a range in which the drive center position is changeable.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the specification, "optical axis" means an optical path of light beams entering in the vertical direction with respect to the center of an image sensor such as a charge coupled device (CCD).

A stereoscopic image capturing system according to the first exemplary embodiment will be described with reference to FIGS. 1 to 3.

Figure 1:
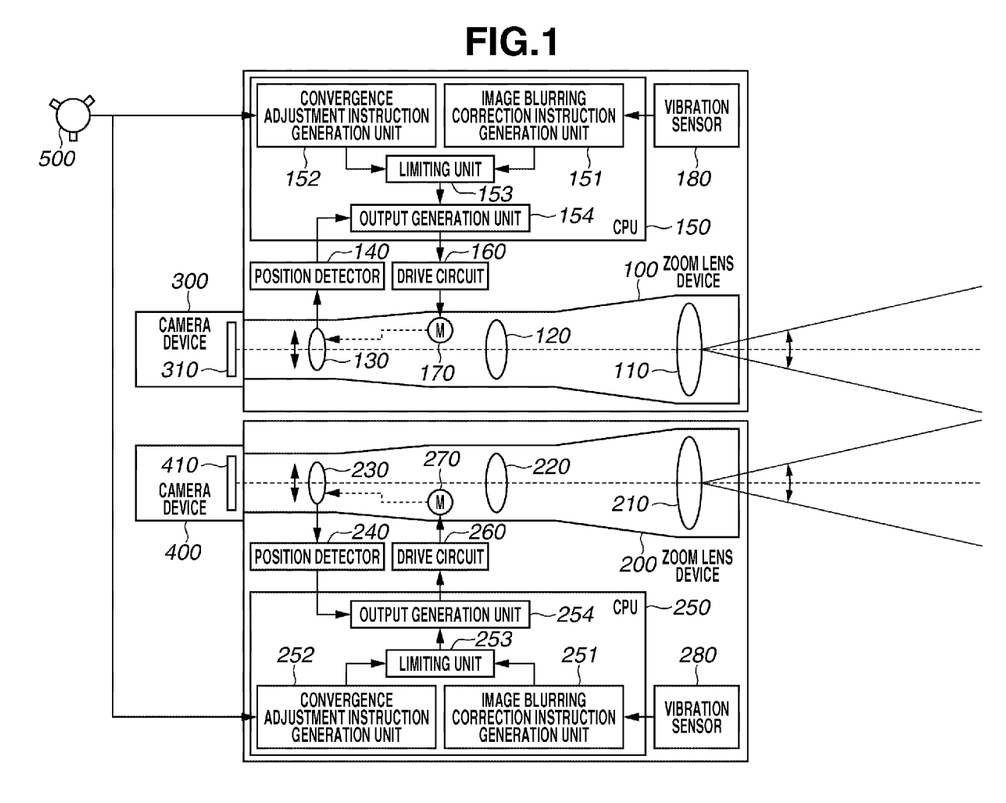
FIG. 1 is a block diagram illustrating a configuration of a stereoscopic image capturing system according to an exemplary embodiment.

FIG. 1 is a block diagram illustrating a configuration of the stereoscopic image capturing system according to the exemplary embodiment.

The stereoscopic image capturing system in FIG. 1 includes a plurality of lens devices, camera devices, and a convergence angle operation member. Specifically, the stereoscopic image capturing system includes a zoom lens device 100 for left eye, a camera device 300, a zoom lens device 200 for right eye, a camera device 400, and a convergence angle operation member 500. The zoom lens device 100 has a function of image blurring correction, and a function (optical axis direction changing function) of changing an optical axis direction using a mechanism for the image blurring correction.

The camera device 300 forms an image on an image sensor 310 with light passed through the zoom lens device 100, and converts the image into video data.

The zoom lens device 200 and the camera device 400 have configurations similar to those of the zoom lens device 100 and the camera device 300 respectively, and consequently, descriptions of the zoom lens device 200 and the camera device 400 are omitted.

The convergence angle operation member 500 is connected to respective communication units (not illustrated) provided in the zoom lens devices 100 and 200. The convergence angle operation member 500 includes an operation unit that is operated by users, and outputs a convergence angle signal based on an amount of operation of the operation unit to the communication units.

In the zoom lens device 100, a focus lens group 110 is an optical element for shifting an image forming position of the zoom lens device 100 by moving to the optical axis direction. The focus lens group 110 is driven and controlled by a focus control unit (not illustrated).

A zoom lens group 120 is an optical element for shifting a focal length of the zoom lens device 100 by moving to the optical axis direction. The zoom lens group 120 is driven and controlled by a zoom control unit (not illustrated).

A shift lens (optical element) 130 is provided to change the optical axis direction of the zoom lens device 100 by a predetermined angle by moving within the plane perpendicular to the optical axis. The shift lens 130 can be independently driven in the horizontal direction (hereinafter, also referred to as "H direction") or in the vertical direction (hereinafter, also referred to as "V direction") within the plane perpendicular to the optical axis, and the drive is performed on respective directions by similar control units.

The drive of the shift lens 130 in the direction perpendicular to the optical axis changes the optical axis direction of the zoom lens device 100. When the optical axis direction is changed to the H direction, the convergence angle between the zoom lens devices is adjusted (hereinafter, also referred to as convergence adjustment). When the optical axis direction is changed to the V direction, the deviation of the center of the image between the zoom lens devices in the V direction is adjusted (hereinafter, also referred to as optical axis adjustment). The driving of the shift lens 130 to the direction perpendicular to the optical axis also means changing of the drive center position of the shift lens 130 to the direction perpendicular to the optical axis in image blurring correction described below.

In the exemplary embodiment, for the sake of simplicity, only a case where the optical axis direction is changed (controlled) to the H direction, and as a result, the convergence angle is changed, that is, convergence adjustment is performed, will be described. However, the description in the exemplary embodiment can also be applied to a case where the optical axis direction is changed (controlled) to the V direction, and as a result, the optical axis adjustment for adjusting the deviation of the center of the image is performed.

A position detector 140 detects a position of the shift lens 130. An output from the position detector 140 is received by a central processing unit (CPU) (control unit) 150 via an analog-to-digital (A/D) converter (not illustrated). The CPU 150 inputs a shift lens drive signal generated based on an instruction signal and a position signal (described below) to a drive circuit (driving unit) 160 via a digital-to-analog (D/A) converter (not illustrated). The drive circuit 160 drives the shift lens 130 using a motor (driving unit) 170.

A vibration sensor (vibration detection unit) 180 detects a vibration transmitted to the zoom lens device 100. An output from the vibration sensor 180 is received by the CPU 150 via an A/D converter (not illustrated).

The CPU 150 performs control of the image blurring correction and the convergence adjustment.

In the image blurring correction control, based on the vibration detected by the vibration sensor 180, an image blurring correction instruction generation unit (calculation unit) 151 calculates a position (hereinafter, also referred to as "correction position") of the shift lens 130 for canceling the image blurring due to the vibration, and generates an instruction signal. The generated instruction signal is input to an output generation unit 154 via a limiting unit 153. Based on the instruction signal and the position signal of the shift lens 130 detected by the position detector 140, a drive signal for driving the shift lens 130 is generated (calculated), and outputs the signal to the drive circuit 160.

In other words, based on the output from the vibration sensor 180, the CPU 150 calculates the amount of drive of the shift lens 130 for correcting the image blurring. Based on the drive signal containing the information about the amount of drive output to the drive circuit 160, the drive circuit 160 and the motor 170 drive the shift lens 130 in the direction orthogonal to the optical axis. According to the above-described operation, the image blurring is corrected. The limiting unit 153 will be described in detail below.

In the control of convergence adjustment, based on a convergence angle signal input from the convergence angle operation member 500, a convergence adjustment instruction generation unit 152 calculates a position (the drive center position of the shift lens 130 in the image blurring correction, in other words it is a position of the shift lens 130 when the vibration is not detected by the vibration sensor 180, and hereinafter, also referred to as "convergence position") of the shift lens 130 that makes the convergence angle, and generates an instruction signal.

The generated instruction signal is input to the output generation unit 154 via the limiting unit 153. The output generation unit 154 outputs the drive signal for the shift lens 130 to the drive circuit 160. Based on the drive signal containing the information about the amount of drive output to the drive circuit 160, the drive circuit 160 and the motor 170 drive the shift lens 130. By the above-described operation, the convergence angle is adjusted.

The limiting unit 153 limits the drive range (the range of the correction position and the convergence position) according to the instruction signals input from the image blurring correction instruction generation unit 151 and the convergence adjustment instruction generation unit 152. In the exemplary embodiment, the convergence adjustment that is important in the realistic stereoscopic image capturing is prioritized, and the image blurring correction operation is limited.

Figure 2:
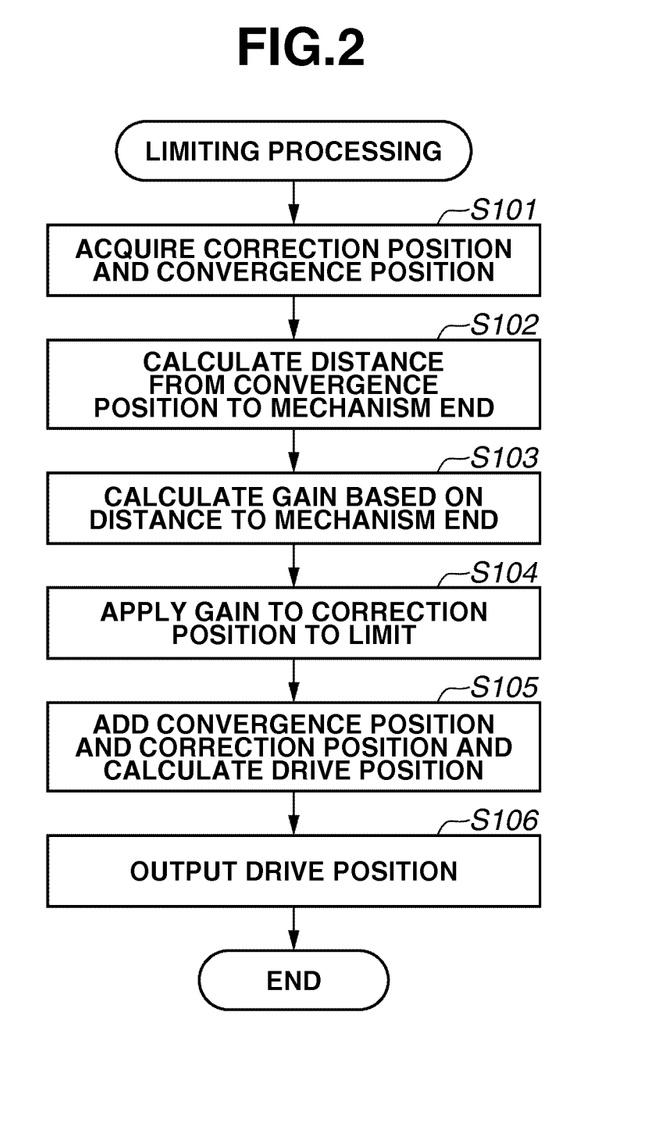
FIG. 2 is a flowchart illustrating a flow of processing in a limiting unit according to a first exemplary embodiment.

FIG. 2 is a flowchart illustrating the processing performed in the limiting unit 153 according to the exemplary embodiment.

In step S101, the limiting unit 153 acquires a correction position and a convergence position from the instruction signals generated in the image blurring correction instruction generation unit 151 and the convergence adjustment instruction generation unit 152. In step S102, using the convergence position, the limiting unit 153 calculates a distance to the end position (mechanism end) closer from the convergence position of the drive mechanism of the shift lens 130.

In step S103, using the distance to the end position, the limiting unit 153 calculates a gain for limitation. In step S104, the limiting unit 153 applies the calculated gain to the correction position to limit the drive range (the range of the correction positions) according to the instruction signal.

With respect to a maximum vibration (maximum correction angle) to be corrected, if the amplitude of the amount of drive of the shift lens 130 (th amplitude of the shift lens 130 driven by the drive signal) necessary to fully correct the maximum correction angle exceeds a distance (larger than a distance) from the convergence position (drive center position) of the shift lens 130 to one of a plurality (two positions of + mechanism end and − mechanism end in FIGS. 3A to 3F which are described later) of drive limit positions (limit positions where the optical element can be driven: the mechanism end) and the nearest drive limit position (+mechanism end in FIGS. 3A to 3F which are described later) that is the nearest to the convergence position (drive center position) of the shift lens 130, the gain is limited to a value such that the amplitude is equal to or less than the distance. In other words, in the above-described case, the value is set to reduce the vibration reduction effect such that the correction position of the shift lens 130 to be driven is limited within the range to the end position (The driving unit is controlled such that the amplitude is limited). The amplitude in this description is amplitudes at both sides (amplitudes in opposite directions; for example, in the upper direction and lower direction, or in the left direction and right direction) of a convergence position (drive center position) when a vibration occurs with the convergence position as the center. In other words, to limit the amplitude to the value equal to or less than the above-described distance is to limit the amplitude to the both sides of the shift lens with the convergence position as the center to the amplitude equal to or less than the above-described distance.

For example, if a maximum correction angle in the image blurring correction in the zoom lens device 100 is two degrees, and the distance to the end position is only one degree, the gain is set to 0.5 times. Consequently, even if the maximum correction angle exceeding the distance to the end position is generated, the drive of the shift lens 130 is limited to the mechanism end. As a result, the image blurring due to the vibration can be reduced to an average level (in this example, to half), and images with less uncomfortable feeling can be acquired.

The maximum correction angle is set by the photographer in advance. If an image blurring exceeding the maximum correction angle occurs (for example, when a large amount of pan drive or tilt drive is performed in the imaging system), the photographer temporarily stops the image blurring correction itself, and after the image blurring becomes equal to or less than the maximum correction angle, resumes the image blurring correction. In addition to the operation, other operations may be performed when the image blurring exceeding the maximum correction angle occurs. For example, if the image blurring exceeding the maximum correction angle occurs, the output from the vibration sensor 180 may be replaced by the maximum correction angle instead of temporally stopping the image bullring correction itself, and then the amount of drive of shift lens for the image bullring correction may be calculated based on the maximum correction angle. Specifically, suppose that the maximum correction angle is 2 degrees, the distance to the end position is 1 degree, and the image blurring exceeding the maximum correction angle is 3 degrees, the output from the vibration sensor 180 (3 degrees) is replaced by the maximum correction angle (2 degrees). The maximum correction angle (2 degrees) is multiplied by the gain (0.5 times) to calculate the amount of drive (1 degree) of the shift lens 130 for correcting the image blurring.

In step S105, the limiting unit 153 adds the convergence position and the limited correction position, and calculates a drive position of the shift lens 130. In step S106, the limiting unit 153 outputs the drive position to the output generation unit 154. By the above-described operation, the limitation is applied to the correction position, and the shift lens 130 is driven.

Figure 3A:
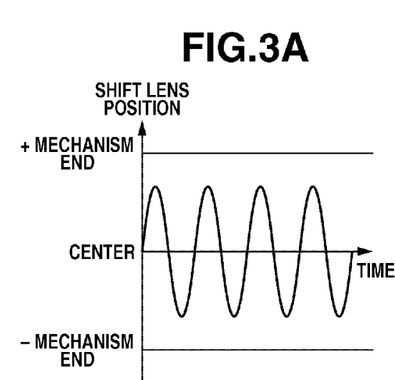
FIGS. 3A, 3B, 3C, 3D, 3E, and 3F illustrate drive positions and amounts of image blurring of an optical element (shift lens) according to the first exemplary embodiment.
Figure 3B:
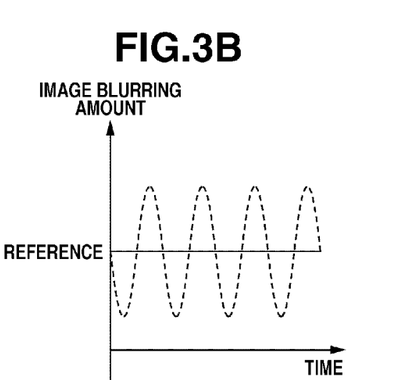
Figure 3C:
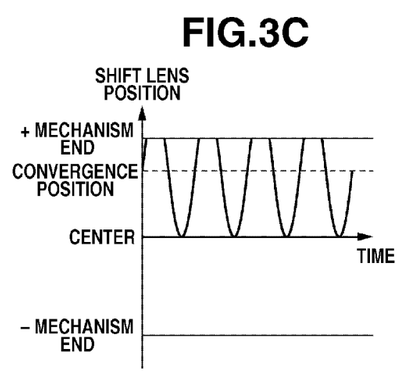
Figure 3D:
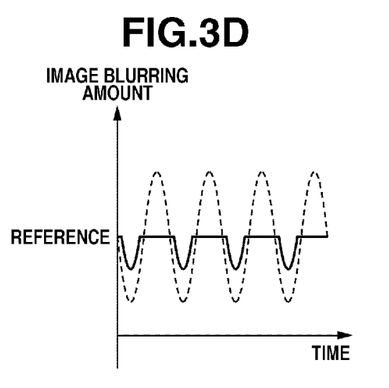
Figure 3E:
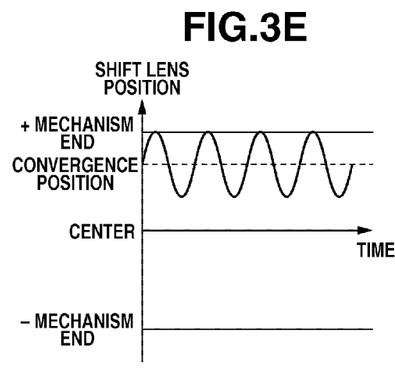
Figure 3F:
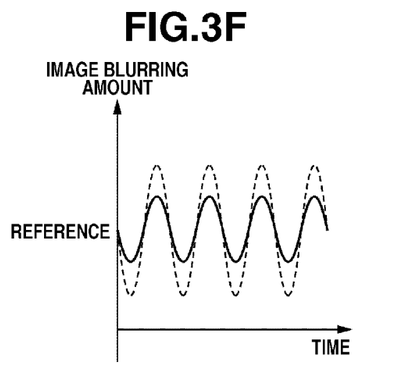

FIGS. 3A, 3B, 3C, 3D, 3E, and 3F illustrate drive positions and amounts of image blurring of the shift lens 130 according to the exemplary embodiment. In FIGS. 3A to 3F, FIGS. 3A and 3B illustrate image blurring correction, FIGS. 3C and 3D illustrate conventional image blurring correction and convergence adjustment, and FIGS. 3E and 3F illustrate image blurring correction and convergence adjustment by giving priority to the convergence adjustment according to the exemplary embodiment.

First, the image blurring correction will be described.

FIG. 3A illustrates, using the solid line, drive position of the shift lens 130 as a result of the image blurring correction. In this example, the convergence adjustment is not performed, and only the image blurring correction is performed. The drive position of the shift lens 130 in this example is a result of drive of the shift lens 130 driven to correct the image blurring due to the vibration illustrated by the dotted line in FIG. 3B. FIG. 3B illustrates, using the solid line, the corrected image blurring amount (residual vibration component) according to the exemplary embodiment. The drawing shows that no residual vibration component is left, the image blurring is ideally corrected, and good images without a vibration are captured.

The conventional image blurring correction and convergence adjustment will now be described.

In FIG. 3C, to the drive position of the shift lens 130 for correcting the image blurring (indicated by the dotted line in FIG. 3D) due to a vibration, the convergence position (also, the position is the drive center position of the shift lens 130 in correcting the image blurring, the position is indicated by the dotted line in FIG. 3C) is added. By the convergence adjustment, the shift lens 130 is driven to the convergence position, and the drive for the image blurring correction is performed with reference to the convergence position. As a result of the addition of the convergence adjustment, the distance to the mechanism end is shortened, and as a result, the shift lens 130 is not fully driven.

In this example, only to the parts the shift lens 130 is not fully driven due to the mechanism end, the image blurring remained, and the residual image blurring becomes the residual vibration component indicated by the solid line in FIG. 3D. As illustrated in the drawing, the images the image blurring is corrected and the images containing the image blurring are mixed, and as a result, the images giving very uncomfortable feeling are provided. Especially, in a case of moving images, the effects of the image blurring correction are not shown, and in some cases, the images cannot be used.

Effects of the limitation in the image blurring correction according to the exemplary embodiment to solve the problem will be described.

In FIG. 3E, to the drive position of the shift lens 130 for correcting the image blurring (indicated by the dotted line in FIG. 3F) due to vibrations, the convergence position (also, the positions are the drive center position of the shift lens 130 in correcting the image blurring, the positions are indicated by the dotted line in FIG. 3E) are added.

In this example, different from the simple addition illustrated in FIG. 3C, as described in FIG. 2, limitation is applied to image blurring correction position using the distance to the mechanism end. Consequently, in FIG. 3E, different from FIG. 3C, the shift lens 130 is driven as illustrated by the solid line in FIG. 3E such that the shift lens 130 is driven within the range to the mechanical end.

The residual vibration component in this example is illustrated by the solid line in FIG. 3F. The residual vibration component is not completely eliminated, but the smooth vibration reduction effects can be obtained, and the effects of the image blurring correction can be shown. According to the exemplary embodiment, the image blurring in the captured images is reduced, and even if the convergence adjustment is performed by the shift lens 130, unlike the known technique, the effective image blurring correction can be performed.

In the exemplary embodiment, depending on the distance to the mechanism end, a certain magnification is applied to a image blurring correction position to limit the amplitude, however, the present invention is not limited to the above. For example, control can be performed such that amplitude of a vibration applied to the zoom lens device 100 is detected, and depending on the amplitude, magnification for limiting the correction position is determined. In other words, when a small vibration is being applied, the limitation of the correction position can be reduced to increase the effect of reducing the vibration, and on the other hand, when a large vibration is being applied, the limitation of the correction position can be increased so that the mechanism end does not perform regulation.

Alternatively, for example, depending on the distance to the mechanism end, the maximum correction angle can be variably controlled. In other words, as the distance to the mechanism end is shortened, the maximum correction angle is to be reduced. If the vibration is less than the maximum correction angle, the residual vibration component can be eliminated to zero, and if the vibration is equal to or greater than the maximum correction angle, the image blurring correction is not performed, and image blurring correction that gives an uncomfortable feeling can be prevented.

In the exemplary embodiment, the shift lens is employed as the optical element for enabling the change of the optical axis direction. However, it is not limited to the above, a mirror or a prism may be employed.

A stereoscopic image capturing system according to a second exemplary embodiment will be described with reference to FIGS. 4 and 5A, and 5B.

In the first exemplary embodiment, the convergence adjustment that is important in the realistic stereoscopic image capturing is prioritized and the image blurring correction is limited. However, if the focal length is long (the zoom magnification is high), the vibration largely affects the images. Consequently, a demand for the image blurring correction is high. Further, if the focal length is long (the zoom magnification is high), an amount of change in parallax with respect to an amount of change in the convergence angle is large. As a result, even if the drive range for the convergence adjustment is small, the effect of dimension can be obtained. Consequently, if the focal length is long, the image blurring correction is to be prioritized and the convergence adjustment is to be limited to effectively use the shift lens 130.

In the exemplary embodiment, an example of prioritizing the image blurring correction and limiting the convergence adjustment is described.

The configuration of the stereoscopic image capturing system according to the exemplary embodiment is similar to that in FIG. 1 according to the first exemplary embodiment, and consequently, its description is omitted.

Figure 4:
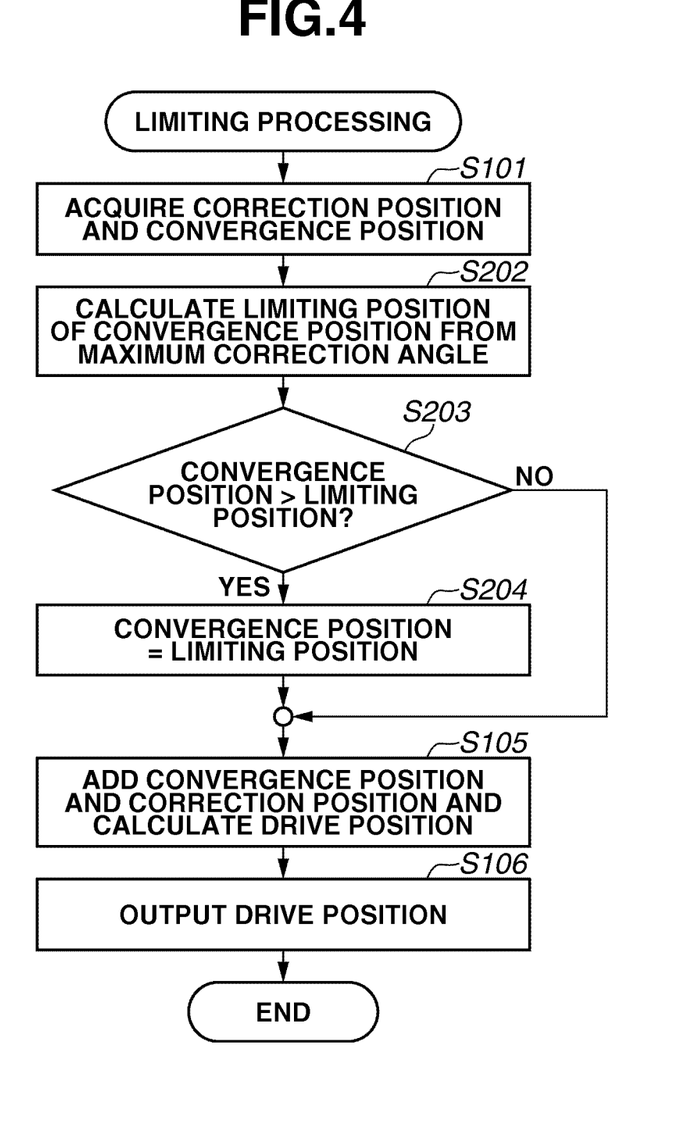
FIG. 4 is a flowchart illustrating a flow of processing in the limiting unit according to a second exemplary embodiment.

FIG. 4 is a flowchart illustrating the flow of the processing performed in the limiting unit 153 according to the exemplary embodiment.

Steps similar to the contents described with reference to FIG. 2 are illustrated in the same reference numerals, and their descriptions are omitted.

In step S202, the limiting unit 153 calculates a maximum value of the convergence position within the range the shift lens 130 can be driven to the maximum correction angle in the image blurring correction as a limiting position of the convergence position. In step S203, the limiting unit 153 determines whether the input convergence position is greater than the limiting position.

If the convergence position is greater than the limiting position (YES in step S203), the processing proceeds to step S204. If the convergence position is less than the limiting position (NO in step S203), the processing directly proceeds to step S105. In step S105, the limiting unit 153 adds the convergence position and the correction position, and outputs a drive position.

Figure 5A:
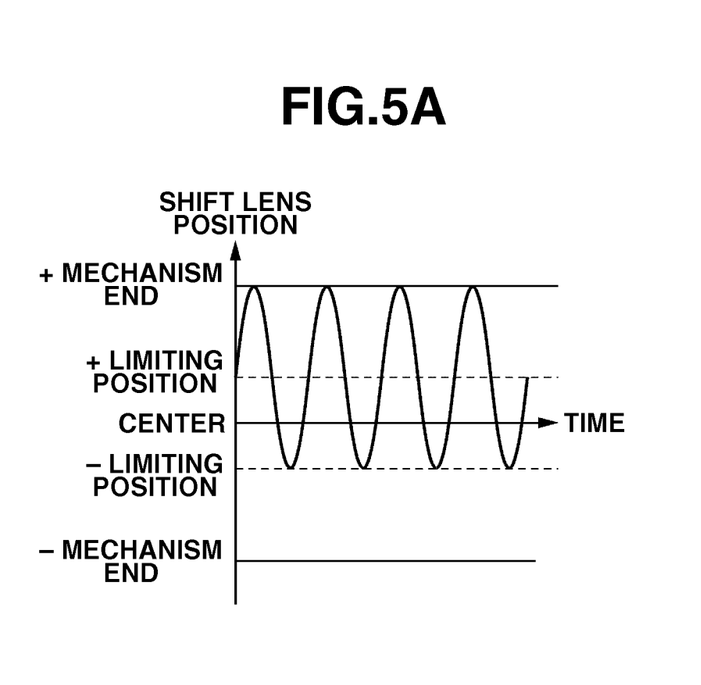
FIGS. 5A and 5B illustrate drive positions and amounts of image blurring of an optical element (shift lens) according to the second exemplary embodiment.
Figure 5B:
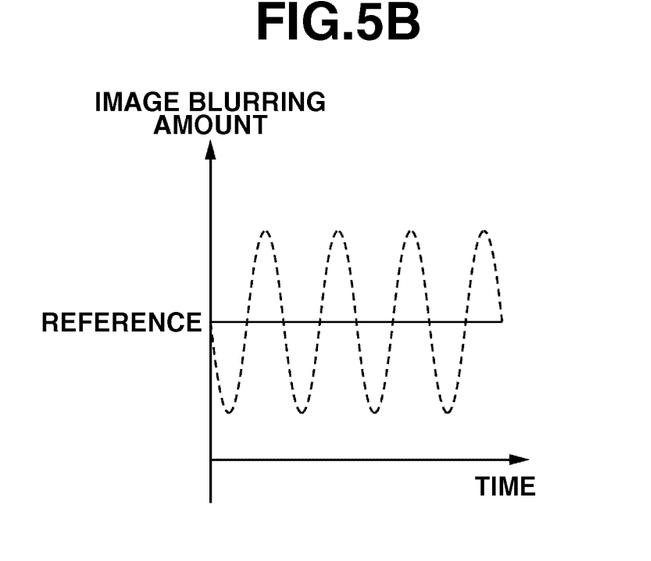

FIGS. 5A and 5B illustrates the drive position of the shift lens 130 and the image blurring amounts according to the exemplary embodiment. FIGS. 5A and 5B illustrate the image blurring correction and the convergence adjustment in prioritizing the image blurring correction.

The solid line in FIG. 5A indicates the drive position of the shift lens 130 for correcting image blurring due to the vibration indicated by the dotted line in FIG. 5B, and the shift lens 130 is driven near the mechanism end when the limiting position of the convergence position is set to a limiting position at the + mechanism end side.

According to the limiting processing described with reference to FIG. 4, the convergence position input to the limiting unit 153 is limited such that the shift lens 130 is not driven to the mechanism end side beyond the limiting position. In other words, if the amplitude of the amount of drive of the shift lens 130 necessary to fully correct the maximum correction angle exceeds a distance from the convergence position (drive center position) of the shift lens 130 to the drive limit position (mechanism end), the convergence position (drive center position) is limited such that the amplitude is equal to or less than the distance (The driving unit is controlled such that the range in which the drive center position is changeable is limited). Consequently, in this case, the residual vibration component is eliminated to zero as illustrated by the solid line in FIG. 5B.

According to the exemplary embodiment, the image blurring of the captured images can be corrected to the maximum, and the convergence adjustment can also be performed in the limited range (limited range in which the drive center position is changeable). As a result, the image blurring correction and the convergence adjustment can be effectively performed.

In the exemplary embodiment, the maximum value of the convergence position within the range the shift lens 130 can be driven to the maximum correction angle is set to the limiting position. However, the present invention is not limited to the above. For example, the limiting position may be set within a range the shift lens 130 can be driven to a predetermined correction angle (a vibration reduction ratio).

A stereoscopic image capturing system according to a third exemplary embodiment will be described with reference to FIGS. 6 and 7.

In the second exemplary embodiment, the image blurring correction that is effective when the focal length is long is prioritized and the convergence position is limited. However, on the other hand, if the focal length is short, the image blurring has a small impact. Consequently, as described in the first exemplary embodiment, the convergence adjustment is to be prioritized, and the image blurring correction is to be limited to effectively use the shift lens 130.

Based on the points, in the exemplary embodiment, a ratio for limiting the image blurring correction and the convergence adjustment is changed (the drive center position of the shift lens 130 is limited) based on the focal length.

The configuration of the stereoscopic image capturing system according to the exemplary embodiment is similar to that in FIG. 1 according to the first exemplary embodiment, and consequently, its description is omitted.

Figure 6:
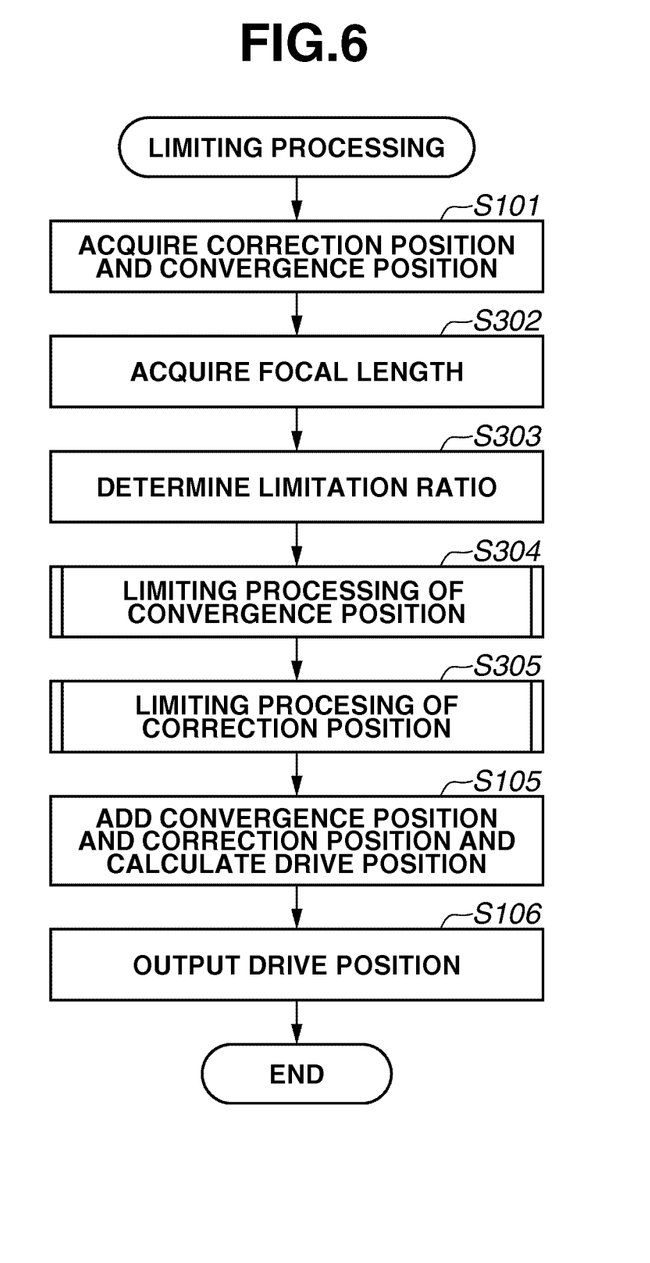
FIG. 6 is a flowchart illustrating a flow of processing in the limiting unit according to a third exemplary embodiment.

FIG. 6 is a flowchart illustrating the flow of the processing performed in the limiting unit 153 according to the exemplary embodiment.

Steps similar to the contents described with reference to FIG. 2 are illustrated in the same reference numerals, and their descriptions are omitted.

In step S302, based on the position of the zoom lens 120, the limiting unit 153 acquires a focal length.

In step S303, using the focal length, the limiting unit 153 determines a limiting position of the convergence position (hereinafter, also referred to as "maximum convergence position") using predetermined table data or a calculation expression. The determination of the maximum convergence position defines the distance from the maximum convergence position to the mechanism end to be a lower limit of the limiting value (hereinafter, also referred to as "minimum correction amplitude") to the distance from the convergence position to the correction position. Consequently, the table data indicates ratios of the maximum convergence position and the minimum correction amplitude in the range the shift lens 130 can move, and as the focal length increases, the minimum correction amplitude increases.

The minimum correction amplitude is to be the same value as an upper limit of the limiting value (hereinafter, also referred to as "maximum correction amplitude") to the distance from the convergence position to the correction position when the convergence position is at the maximum convergence position. By the amount the convergence position is separated from the maximum convergence position, the distance between the minimum correction amplitude and the maximum correction amplitude increases.

Figure 7:
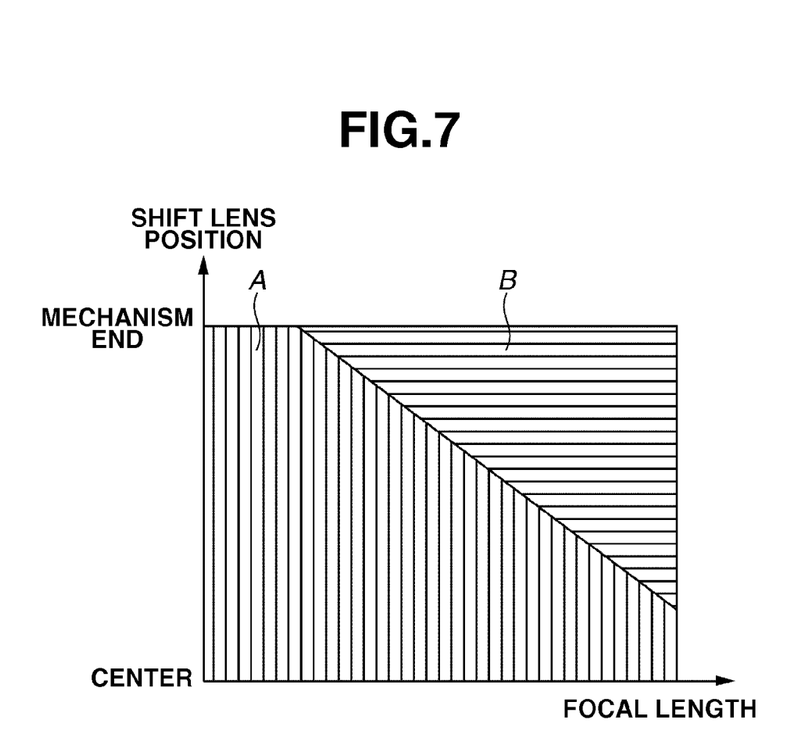
FIG. 7 illustrates ratios of maximum convergence positions to minimum correction amplitudes according to the third exemplary embodiment.

FIG. 7 illustrates the ratio of the maximum convergence position to the minimum correction amplitude according to the exemplary embodiment.

In the drawing, the region of the convergence position is illustrated as the region A, and the region of the correction position is illustrated as the region B.

In the region the focal length is short, the image blurring due to images has a small impact. Consequently, the minimum correction amplitude is set to zero such that the region the shift lens 130 can move can be used for the convergence positions to the maximum. In a case of a maximum focal length, that is, when the focal length has a longest length, the minimum correction amplitude is set to the maximum correction angle to obtain a maximum vibration reduction effect in the image blurring correction.

In step S304 in FIG. 6, the limiting unit 153 performs processing similar to the processing in steps S203 and 204 in FIG. 4 using the maximum convergence position determined in step S303 to limit the convergence position acquired in step S101. In step S305, the limiting unit 153 performs processing similar to the processing in step S102 to step S104 in FIG. 2 to limit the correction position in the image blurring correction.

By the above-described processing, the effects of the image blurring correction and the convergence adjustment that vary depending on the focal length can be obtained. As a result, the shift lens 130 can be effectively used and both of the two functions can be effectively compatible.

In the exemplary embodiment, the ratio of the limitation is sequentially varied based on the focal length, however, it is not limited to the above. For example, the convergence adjustment and the image blurring correction priority can be switched at a specific focal length. Alternatively, an input unit may be provided to enable the user to select the priority or set the ratio.

In the above-described exemplary embodiments, the shift lens 130 is driven only in the H direction (the convergence adjustment and the image blurring correction in the H direction). However, it is not limited to the above, the shift lens 130 can be driven in the V direction (the optical axis adjustment and the image blurring correction in the V direction) similarly to the drive in the H direction.

Similarly to the adjustment of the convergence angle of the zoom lens device by the convergence adjustment, a shift of the image center of the zoom lens device can be adjusted by the optical axis adjustment. In the H direction and the V direction, it is not always necessary to perform the same limitation control, for example, in the H direction, the convergence adjustment may be prioritized, and in the V direction, the image blurring correction may be prioritized. Alternatively, in the H direction, only the convergence angle adjustment may be performed, and in the V direction, only the image blurring correction may be performed.

While the present invention has been described with reference to the exemplary embodiments, it is to be understood that the invention is not limited to the described exemplary embodiments, various modifications and changes can be made within the scope of the invention.

For example, in the first to third exemplary embodiments, the stereoscopic image capturing system includes the two image capturing apparatuses each having the camera device and the zoom lens device (lens device). Alternatively, in another exemplary embodiment, the stereoscopic image capturing system includes one imaging capturing apparatus and one lens apparatus. In the first to third exemplary embodiments, the stereoscopic image capturing system includes the two camera devices (imaging devices). Alternatively, the image capturing processing may be performed using one camera device (imaging device).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-195059 filed Sep. 7, 2011, which is hereby incorporated by reference herein in its entirety.

What is claimed is:

1. A stereoscopic lens system comprising:
a plurality of lens devices, wherein each lens device includes an optical element;
a vibration detection unit configured to detect a vibration;
a control unit configured to calculate a drive signal to drive the optical element for correcting image blurring based on an output from the vibration detection unit; and
a driving unit configured to drive the optical element in a direction orthogonal to the optical axis based on the drive signal,
wherein the control unit controls the driving unit to change a drive center position, which is a position of the optical element when the vibration is not detected by the vibration detection unit, in a direction orthogonal to the optical axis,
wherein the control unit controls, if an amplitude of the optical element driven by the drive signal is larger than the distance between the nearest drive limit position and the drive center position, the driving unit to limit the amplitude, and
wherein the nearest drive limit position is one of a plurality of drive limit positions to which the optical elements is movable and nearest to the drive center position.

2. The stereoscopic lens system according to claim 1, wherein the control unit is configured to control the driving unit such that the drive center position is limited based on a focal length in the lens device.

3. The stereoscopic lens system according to claim 1, wherein the control unit is configured to control the driving unit such that the amplitude is limited based on a focal length in the lens device.

4. The stereoscopic lens system according to claim 1, wherein the control unit is configured to control the driving unit such that the drive center position is changed to a direction orthogonal to the optical axis to adjust a convergence angle among the plurality of lens devices.

5. The stereoscopic lens system according to claim 1, wherein the control unit is configured to control the driving unit such that the drive center position is changed to a direction orthogonal to the optical axis to adjust a deviation of an image center among the plurality of lens devices.

6. A lens device comprising:
an optical element;
a vibration detection unit configured to detect a vibration;
a control unit configured to calculate a drive signal to drive the optical element for correcting image blurring based on an output from the vibration detection unit; and
a driving unit configured to drive the optical element in a direction orthogonal to the optical axis based on the drive signal,
wherein the control unit controls the driving unit to change a drive center position, which is a position of the optical element when the vibration is not detected by the vibration detection unit, in a direction orthogonal to the optical axis,
wherein the control unit controls, if an amplitude of the optical element driven by the drive signal is larger than the distance between the nearest drive limit position and the drive center position, to control the driving unit to limit the amplitude, and
wherein the nearest drive limit position is one of a plurality of drive limit positions to which the optical element is movable and nearest to the drive center position.

7. A stereoscopic image capturing system comprising:
a plurality of lens devices, wherein each lens device includes an optical element;
a plurality of camera devices, wherein each camera device includes an imaging element and a light transmitted through the lens device is converted into image data by the imaging element;
a vibration detection unit configured to detect a vibration;
a control unit configured to calculate a drive signal to drive the optical element for correcting image blurring based on an output from the vibration detection unit; and
a driving unit configured to drive the optical element in a direction orthogonal to the optical axis based on the drive signal,
wherein the control unit controls the driving unit to change a drive center position, which is a position of the optical element when the vibration is not detected by the vibration detection unit, in a direction orthogonal to the optical axis,
wherein the control unit controls, if an amplitude of the optical element driven by the drive signal is larger than the distance between the nearest drive limit position and the drive center position, the driving unit to limit the amplitude, and
wherein the nearest drive limit position is one of a plurality of drive limit positions to which the optical element is movable and nearest to the drive center position.

8. A stereoscopic lens system comprising:
a plurality of lens devices, wherein each lens device includes an optical element;
a vibration detection unit configured to detect a vibration;
a control unit configured to calculate a drive signal to drive the optical element for correcting image blurring based on an output from the vibration detection unit; and a driving unit configured to drive the optical element in a direction orthogonal to the optical axis based on the drive signal, wherein the control unit controls the driving unit to change a drive center position, which is a position of the optical element when the vibration is not detected by the vibration detection unit, in a direction orthogonal to the optical axis, and wherein the control unit controls, if an amplitude of the optical element driven by the drive signal is larger than the distance between the nearest drive limit position and the drive center position, the driving unit to limit a range in which the drive center position is changeable, and wherein the nearest drive limit position is one of a plurality of drive limit positions to which the optical element is movable and nearest to the drive center position.

9. The stereoscopic lens system according to claim 8, wherein the control unit is configured to control the driving unit such that the drive center position is limited based on a focal length in the lens device.

10. The stereoscopic lens system according to claim 8, wherein the control unit is configured to control the driving unit such that the amplitude is limited based on a focal length in the lens device.

11. The stereoscopic lens system according to claim 8, wherein the control unit is configured to control the driving unit such that the drive center position is changed to a direction orthogonal to the optical axis to adjust a convergence angle among the plurality of lens devices.

12. The stereoscopic lens system according to claim 8, wherein the control unit is configured to control the driving unit such that the drive center position is changed to a direction orthogonal to the optical axis to adjust a deviation of an image center among the plurality of lens devices.

13. A lens device comprising:
an optical element;
a vibration detection unit configured to detect a vibration;
a control unit configured to calculate a drive signal to drive the optical element for correcting image blurring based on an output from the vibration detection unit; and
a driving unit configured to drive the optical element in a direction orthogonal to the optical axis based on the drive signal, wherein the control unit controls the driving unit to change a drive center position, which is a position of the optical element when the vibration is not detected by the vibration detection unit, in a direction orthogonal to the optical axis, and wherein the control unit controls, if an amplitude of the optical element driven by the drive signal is larger than the distance between the nearest drive limit position and the drive center position, the driving unit to limit a range in which the drive center position is changeable, and wherein the nearest drive limit position is one of a plurality of drive limit positions to which the optical element is movable and nearest to the drive center position.

14. A stereoscopic image capturing system comprising:
a plurality of lens devices, wherein each lens device includes an optical element;
a plurality of camera devices, wherein each camera device includes an imaging element and a light transmitted through the lens device is converted into image data by the imaging element;
a vibration detection unit configured to detect a vibration;
a control unit configured to calculate a drive signal to drive the optical element for correcting image blurring based on an output from the vibration detection unit; and
a driving unit configured to drive the optical element in a direction orthogonal to the optical axis based on the drive signal, wherein the control unit controls the driving unit to change a drive center position, which is a position of the optical element when the vibration is not detected by the vibration detection unit, in a direction orthogonal to the optical axis, and wherein the control unit controls, if an amplitude of the optical element driven by the drive signal is larger than the distance between the nearest drive limit position and the drive center position, the driving unit to limit a range in which the drive center position is changeable, and wherein the nearest drive limit position is one of a plurality of drive limit positions to which the optical element is movable and nearest to the drive center position.

* * * * *